March 19, 1963 W. R. JOHNSON ETAL 3,082,293

TRANSDUCING SYSTEM

Filed Dec. 21, 1959 3 Sheets-Sheet 1

INVENTORS:
Wayne R. Johnson
Chester C. Shaw
By Smyth & Roston
Attorneys.

TRANSDUCING SYSTEM

Filed Dec. 21, 1959 3 Sheets-Sheet 2

INVENTORS:
Wayne R. Johnson
Chester C. Shaw
By Smyth & Roston
Attorneys,

TRANSDUCING SYSTEM

Filed Dec. 21, 1959 3 Sheets-Sheet 3

INVENTORS:
Wayne R. Johnson
Chester C. Shaw
By Smyth & Roston
Attorneys,

United States Patent Office
3,082,293
Patented Mar. 19, 1963

3,082,293
TRANSDUCING SYSTEM

Wayne R. Johnson and Chester C. Shaw, Los Angeles, Calif., assignors to Minnesota Mining and Manufacturing Company, St. Paul, Minn., a corporation of Delaware Filed Dec. 21, 1959, Ser. No. 861,133
18 Claims. (Cl. 178—6.6)

This invention relates to recording and reproducing apparatus and, more particularly, to such apparatus for recording and reproducing wide band signals such as television signals on a magnetic tape.

The difficulties encountered in recording and reproducing television images stem primarily from the very large amount of information that must be transmitted in a very short time. Under present United States standards, scanning of the field of view is accomplished at a rate of 30 frames per second, each frame being scanned in 525 lines, and the resulting signal occupies a frequency band theoretically extending from direct current or zero frequency to 4 megacycles per second. Using the most refined recording methods now available, it is possible to record longitudinally on a magnetic tape up to approximately 10,000 cycles per inch of tape. Taking the 10,000 cycles per inch figure as a reference, however, a tape speed of 400 inches per second is required if the entire information is to be recorded on a single track. Such tape speeds involve the use of a vast length of tape for recording even short interval pictures. The weight and inertia of the reels on which the tape is stored of themselves introduce problems of handling and instrumentation that make the use of direct recording difficult, quite aside from the cost of the recording medium itself.

Accordingly, there have been developed a number of systems of "bandsplitting" whereby the maximum frequencies to be recorded on a single track are reduced by a factor of 2 or more. Certain such procedures are disclosed in prior patents and applications of Wayne R. Johnson, including the Patent No. 2,694,748 for a Television Signal Reproducing System, issued November 16, 1954, and application Serial No. 506,817 filed May 9, 1955, now Patent No. 2,892,886. These applications and patents relate to various methods of sampling the original signal at intervals to produce wave trains which, when recorded and reproduced, carry frequencies the highest components whereof are sub-multiples of the maximum frequency in the original signals. Accordingly, the tape can be progressed at a fraction of the speed required for direct recording.

In each of these systems, the amplitude of the sampled television signals is recorded on an analog basis. The intelligence is, therefore, carried throughout a range of amplitudes in the dynamic range of the reproducing apparatus. During the recording and reproducing sequences of the sampled signals, however, both the amplitude and the phase of the signals are distorted due to a number of factors. For example, instantaneous variations in the speed of any one of the tracks varies both the phase and the amplitude of the reproduced signals from that track. Instantaneous variations in the speed of different tracks or of the entire tape may occur due to vibration of the tape, which is referred to as flutter, and due to mechanical misalignment between the recording and playback transducers which is referred to as skew. Due to skew and the tape flutter, the speed of the tape may vary during either the recording and reproducing sequences. Moreover, distortions may be introduced because of the well-known phenomena of reproducing the higher frequency signals at relatively higher amplitudes. Even though equalization can be utilized to substantially correct for this phenomena, some amplitude distortion persists.

In a specific illustrative embodiment of this invention, the television signals are sampled and the samplings are converted to pulse code modulated signals. The modulated signals are then introduced to a number of tracks on the recording medium. A predetermined maximum error in the amplitude of the samplings is provided depending upon the particular pulse coding of the signals. The maximum error may be reduced to any particular desired value by increasing the number of digits utilized in the modulation. In the specific illustrative embodiment, the analog television signals are first converted to a 9-digit code and then converted to a 2 out of 4 tertiary pulse code. Two pairs of tracks are alternately utilized for recording the pulse code modulated signals with one of three different magnitude pulses being recorded on each of two of the tracks for each sampling of the television signals. As recorded, therefore, the signals in one pair of tracks are out of phase with the signals recorded on the other pair of tracks.

When the signals are reproduced, means are provided for equalizing them and for compensating for any phase errors due to tape flutter or variation of phase between the signals from successive tracks. The compensating means includes a phase averaging circuit which drives sampling switches to which the reproduced signals are provided. The signals are sampled at an instantaneous rate dependent upon the average phase. The sampled, phase corrected, signals are then provided to demodulating means for recovering the original video signals.

Further features of this invention relate to the provision of differential amplifier means which are sampled in synchronism with the sampling of the signals. The differential amplifier means are part of the pulse code modulator and the differential amplifier means are sampled at one-half the rate of the sampling rate of the video signals. Each alternating sampling from the differential amplifier means are provided to a different pair of the four tracks on the recording medium.

Still further features relate to the utilization of three signal levels with the pulse coding being on a tertiary digital basis. Balancing problems are avoided as errors are eliminated merely by recognizing the three different signal levels.

Further features and advantages of this invention will become apparent upon consideration of the following description when read in conjunction with the drawing wherein.

Figure 1:
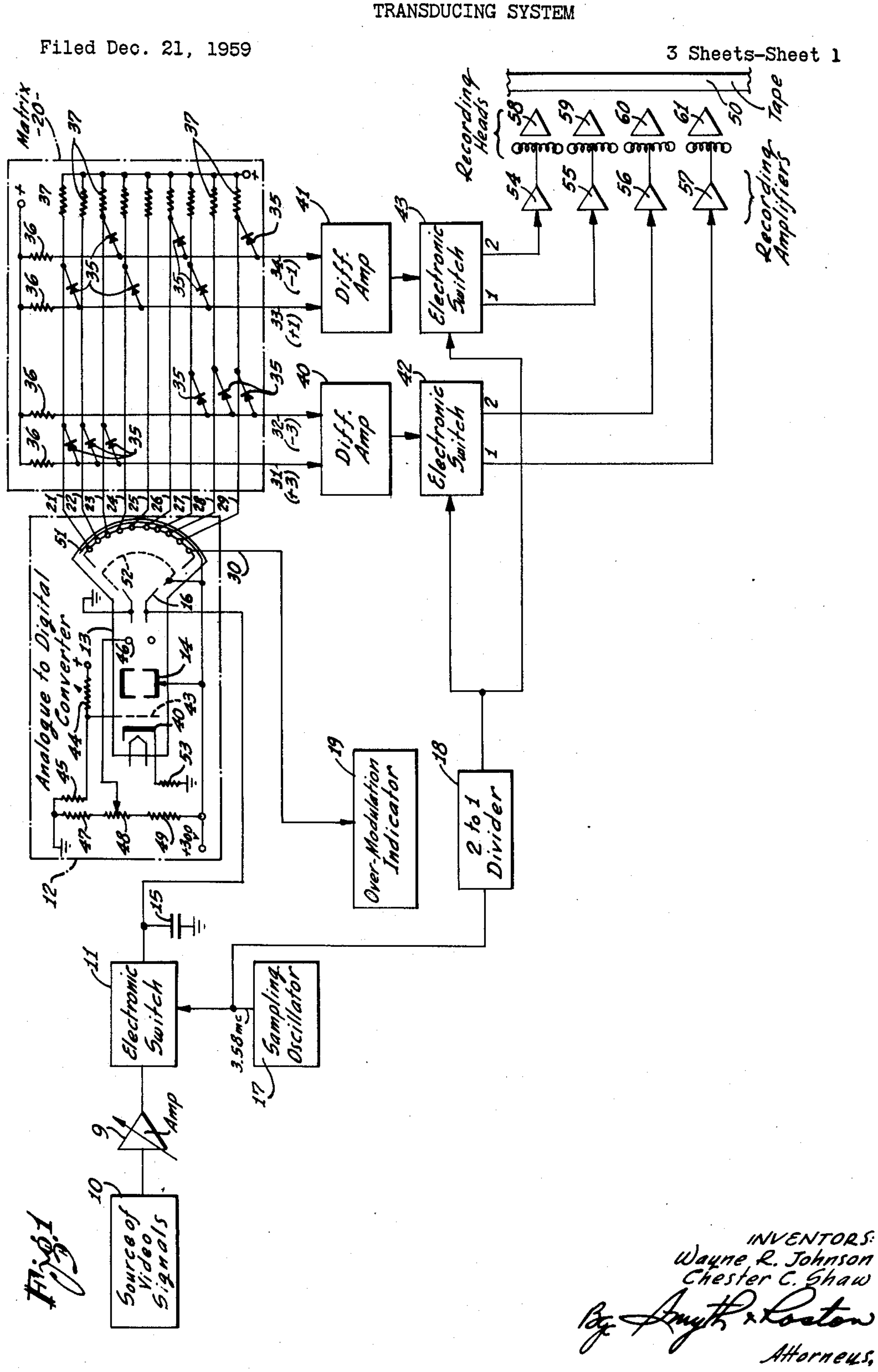
FIGURE 1 is a functional representation of the recording apparatus utilized in the recording and reproducing system of this invention.

Referring first to FIGURE 1, the video signals to be recorded on a magnetic tape 50 are supplied from a source 10. The source 10 illustratively may be a television camera or a television receiver. The signals from the source 10, which may include standard blanking and synchronizing signals, are amplified by an adjustable video amplifier 9 and the amplified video signals are introduced to an electronic switch 11. The switch 11 may be any one of a large number of gating or switching arrangements. One suitable switch of this character is illustrated on page 4 of volume 19, "Waveforms," of the Radiation Laboratory Series (McGraw-Hill, 1949) and various other types of carrier-balanced half wave modulators can be used.

The electronic switch 11 is successively operated to sample the video signals by a sampling oscillator 17. The frequency of the oscillator 17 may be an odd multiple of the television line frequency, illustratively, 3.58 megacycles which is the 455th harmonic of one-half the line frequency of 15,750 cycles per second. The switch 11 is so biased as to sample the television signals only on the positive peaks of the 3.58 megacycle signal from the oscillator 17, thus, providing at the output of the switch 11 short pulses or samples of the original television signals every 0.28 microsecond.

The sampling pulses thus produced by the switch 11 charge a capacitor 15 to the instantaneous voltage of the sample to derive from the original signal a related signal in which the voltage changes by successive steps each with each new voltage persisting for 0.28 microsecond. The stepped voltage thus produced at the capacitor 15 is applied to an analog to digital converter 12. The converter 12 digitizes the television signals by selectively energizing nine digit or control leads 21 through 29 in accordance with the magnitude and polarity of the sampling at the capacitor 15. The conversion is, therefore, from an analog signal to a digital signal having nine different possible digits.

The converter 12 includes switching means in the form of a cathode ray tube 13 which is adapted to switch the successive voltages appearing across the capacitor 15 to selectively energize the leads 21 through 29 in accordance with the magnitude and polarity of the potential across the capacitor 15. The tube 13, which may be a line beam switching tube of the type commercially available under the designation "LBS 1," includes means for developing an electronic beam having a generally linear cross-section, being long in one dimension (perpendicular to the diagram) and quite narrow in the plane of the diagram. The electrons forming the beam are emitted from a cathode 40 and accelerated by an anode 14 which is apertured to permit the electrons to pass through it. The cathode 40 is coupled to ground by a conventional biasing resistor 53. Between the cathode 40 and the anode 14 is a control electrode 43 which is in the form of a grid through which the beam passes. The intensity or electrode density is substantially constant and is determined by the setting of a rheostat 44 coupled in a voltage divider arrangement with the resistor 45 to the control electrode 43. Under typical operating conditions, the accelerating anode 14 may be operated at a potential of +300 volts. After passing through the anode, the beam then passes between a pair of focusing electrodes 46 which are maintained at a voltage somewhat negative to the accelerating anode 14. The voltage applied to the focusing electrode 46 is adjustable being determined by the adjustment of a potentiometer 48. The potentiometer 48 is serially connected with two resistors 47 and 49 between a +300 volt potential source and a ground connection. The focusing potential may be adjusted within a range of from approximately +25 volts to +80 volts.

After passing between the focusing electrodes 46, the beam is deflected by a pair of deflecting plates 16. One of the plates 16 is grounded and the potential at the other deflecting plate 16 is provided from the capacitor 15. The beam is deflected by the plates 16 to one of ten anodes linearly positioned across the face of the tube 13. The beam impinges upon a particular one of the 10 anodes in accordance with the magnitude and polarity of the potential across the capacitor 15. A shield or screen 52 surrounds the path of the beam between the deflecting plates and the 10 anodes and an outer shield 51 lies behind the ten anodes. Both shields 52 and 51 are operated at a potential of the accelerating anode so as to couple any stray electrons and remove them from the field of operation of the tube 13.

As indicated above, one of the 10 leads 21 through 30 is energized by each sample from the electronic switch 11. The lead 30 is coupled to an over-modulation indicator 19 which provides an indication to the operator that the magnitude of the video signals is excessive. The amplifier 9 may accordingly be adjusted to reduce the amplitudes somewhat so that the maximum amplitude of the video signal impinges upon either the first or last of the 9 anodes associated with the leads 21 through 29. The lead 25 is energized when the potential across the capacitor 15 is zero volts; the leads 24 to 21 are energized for positive potentials across the capacitor 15; and the leads 26 to 29 are energized for negative potentials across the capacitor 15.

The nine digital leads 21 through 29 are coupled to a diode-matrix 20 which includes a number of diodes 35 connected in a coordinate array between selected ones of the nine leads 21 through 29 and selected ones of four output leads 31 through 34. The leads 21 through 29 terminate individually at 9 resistors 37 which are coupled to a positive potential source, and the leads 31 through 34 terminate individually at 4 resistors 36 which also terminate at a positive potential source. When any one of the nine digital leads 21 through 29 is energized, it functions to forward bias any of the diodes 35 connected thereto.

As described above, the converter 12 functions essentially to digitize the television signals by energizing one of the nine control leads 21 through 29 in accordance with the magnitude and polarity of the television signal. The conversion, therefore, by the converter 12 is from an analog to a digital signal having nine different possible digits. The matrix 20 functions to convert the nine-digit signals to a combination of zero, 1 or 2 out of 4 digital signals. The signals from the matrix 20 are in the form of the selective energization of the four leads 31 through 34, with none or one or two of the four leads 31 through 34 being energized. As is hereinafter described, the signals at the leads 31 through 34 are converted to tertiary signals (three valued) by two differential amplifiers 40 and 41.

Figure 4:
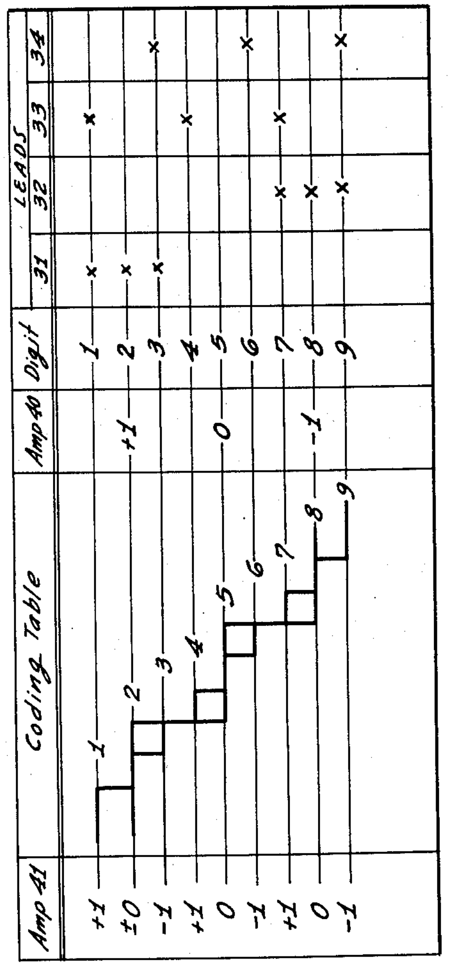
FIGURE 4 is a graphical representation of a coding table illustrating the pulse code modulation utilized in the recording and reproducing system of this invention.

When the lead 25 from the converter 12 is energized, none of the four leads 31 through 34 are energized because none of the diodes 35 are coupled to the lead 25. The coding provided by the matrix 20 is illustrated in FIGURE 4. As indicated therein, the coding provided by the matrix 20 and the differential amplifiers 40 and 41 is a two-out-of-four tertiary code. In other words, the output from amplifiers 40 and 41 are digital signals having two places with each place consisting of a digit having one of three possible values. Leads 31 and 32 are utilized for one place and the leads 33 and 34 are utilized for the second place. Numerically, when the lead 31 is energized, it indicates a value of +3 and when the lead 32 is energized, it indicates a value of −3. When the lead 33 is energized, it indicates a value of +1 and when the lead 34 is energized, it indicates a value of −1. These values indicate the digital spacing from the lead 25. The lead 25 is the zero or center lead with the leads 24, 23, etc., being successively more positive and the leads 26, 27, etc., being successively more negative. For example, if the lead 31 is the only lead energized of the four leads 31 through 34, a value of +3 is indicated and the digit corresponds with lead 22. Only a single diode 35 is connected to the lead 22, the one which couples the lead 22 to the lead 31. When the lead 22 is, therefore, energized, only the lead 31 of the four leads 31 through 34 is energized. The coding table in FIGURE 4 illustrates which of the leads are energized for the energization of each of the 9 leads 21 through 29.

The four leads 31 through 34 are coupled to differential amplifiers 40 and 41. The leads 31 and 32 are coupled to the amplifier 40 and the leads 33 and 34 are coupled to the amplifier 41. The amplifiers 40 and 41 are conventional and each provides an output indication in accordance with the difference of its two input indications. The output of each of the amplifiers 40 and 41 has, therefore, three possible values which may be designated +1, 0 and −1 in accordance with the tertiary coding determined by the operation of the matrix 20. In terms of the numbers at the leads 31 through 34, the output of the amplifier 40 may represent +3, 0 or −3 and the output of the amplifier 41 may represent +1, 0 or −1. The outputs of the two amplifiers 40 and 41, therefore, together represent any of the 9 whole numbers between −4 to +4. The two tertiary or three valued signals from the amplifiers 40 and 41 change each 0.28 microsecond, or each time the voltage at the capacitor 15 changes.

The tertiary signals from the amplifiers 40 and 41 are introduced respectively to electronic switches 42 and 43 which may be somewhat similar to the electronic switch 11 described above. Each of the switches 42 and 43 has a single input terminal and two output terminals 1 and 2. Depending upon the condition of each switch, the tertiary signals at its input are provided either to its terminal 1 or to its terminal 2. The switches 42 and 43 are synchronously operated with the electronic switch as they are operated by a pulse divider 18 which is driven by the sampling oscillator 17. The divider 18 may be a two-to-one, or binary pulse divider so that the electronic switches 42 and 43 are operated for each alternate sample provided by the electronic switch 11. The successive pulses from the divider 18 function to switch the tertiary signals alternately to the terminals 1 and 2 of the switches 42 and 43. The duration of the signals from the electronic switches 42 and 43 may have a duration also of 0.28 microsecond which is the same as that of the voltage steps across the capacitor 15.

The output terminals of the electronic switches 42 and 43 are coupled respectively to four recording amplifiers 54 through 57. The terminals 1 of the switches 42 and 43 are coupled respectively to the amplifiers 57 and 55, and the terminals 2 of the switches 42 and 43 are coupled respectively to the amplifiers 56 and 54. The switches 42 and 43 operate in this manner to effectively establish communication channels to the pair of amplifiers 57 and 55 for one sample and then for the next sample to the amplifiers 54 and 56. The recording amplifiers 54 through 57 introduce the pulse code modulated signals to the individually associated recording heads or transducers 58 through 61. The heads 58 through 61 are positioned adjacent a magnetic tape 50 which may be moving at a rate of 120 inches per second to provide for recording video signals from the source 10 having frequencies up to four megacycles. The signals recorded in each track are tertiary, each having one of three possible values with signals being recorded in only two of four tracks on the tape 50 at any one time.

To briefly recapitulate, consider the operation of the matrix 20, etc., when the lead 22 from the converter 12 is energized. When the lead 22 from the converter 12 is energized, the matrix 20 energizes the lead 31 of the four leads 31 through 34. The output of the differential amplifier 41 is, therefore, at its median value since neither one of its two leads 33 and 34 is energized. The output of the differential amplifier 40, however, is relatively positive due to the energization of its lead 31 but not of its lead 32. Assuming that the electronic switches 43 and 44 are in a condition at this time to establish communication paths to their terminals 1, the output signals from the amplifiers 40 and 41 are coupled respectively to the recording amplifiers 57 and 55. The recording head 61 associated with the amplifier 57 accordingly records a relatively positive signal on the magnetic tape 50 whereas the recording head 59 associated with head 55 records a medium level signal. The two heads 58 and 60 are not energized at this time.

For the next sample, a different combination of the leads 31 through 34 are energized and the switches 42 and 43 establish connections to the amplifiers 54 and 56 instead of to the amplifiers 55 and 57. In this manner, the wide band video signals from the source 10 are converted to tri-valued or tertiary signals and recorded in four tracks on the magnetic tape 50. The pulses recorded in each track are out of step with the pulses recorded in adjacent tracks due to the switching operation of the electronic switches 42 and 43.

Figure 2:
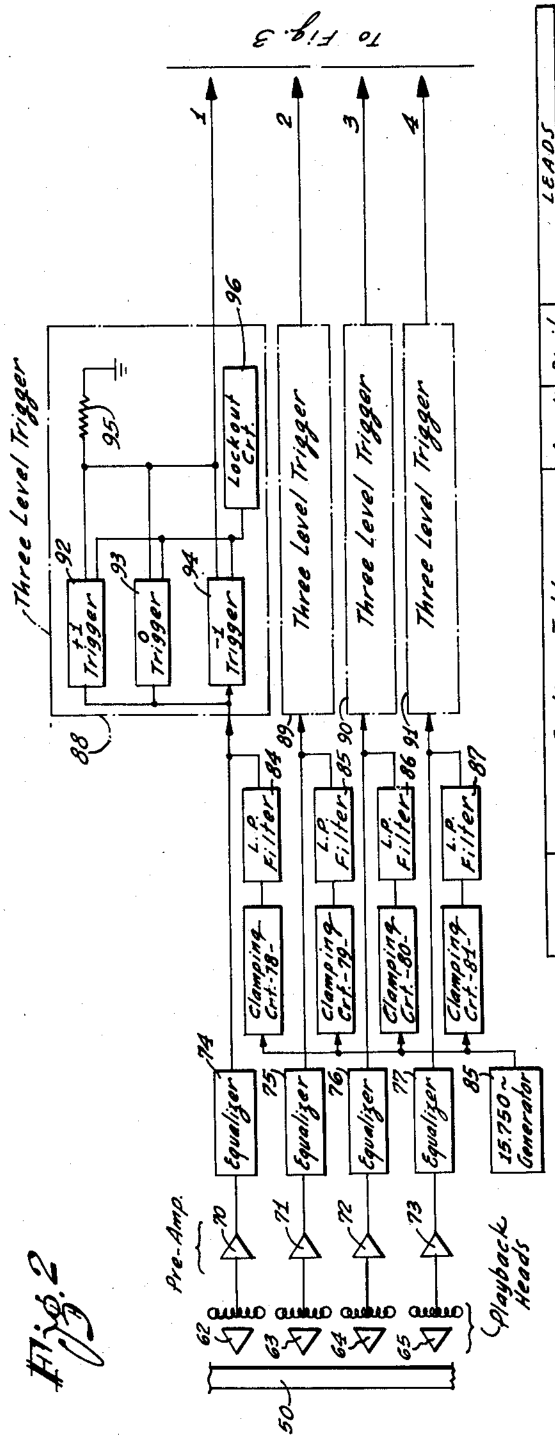
FIGURE 2 is a functional representation of a portion of the reproducing apparatus utilized in the recording and reproducing system of this invention.
Figures 3, 5:
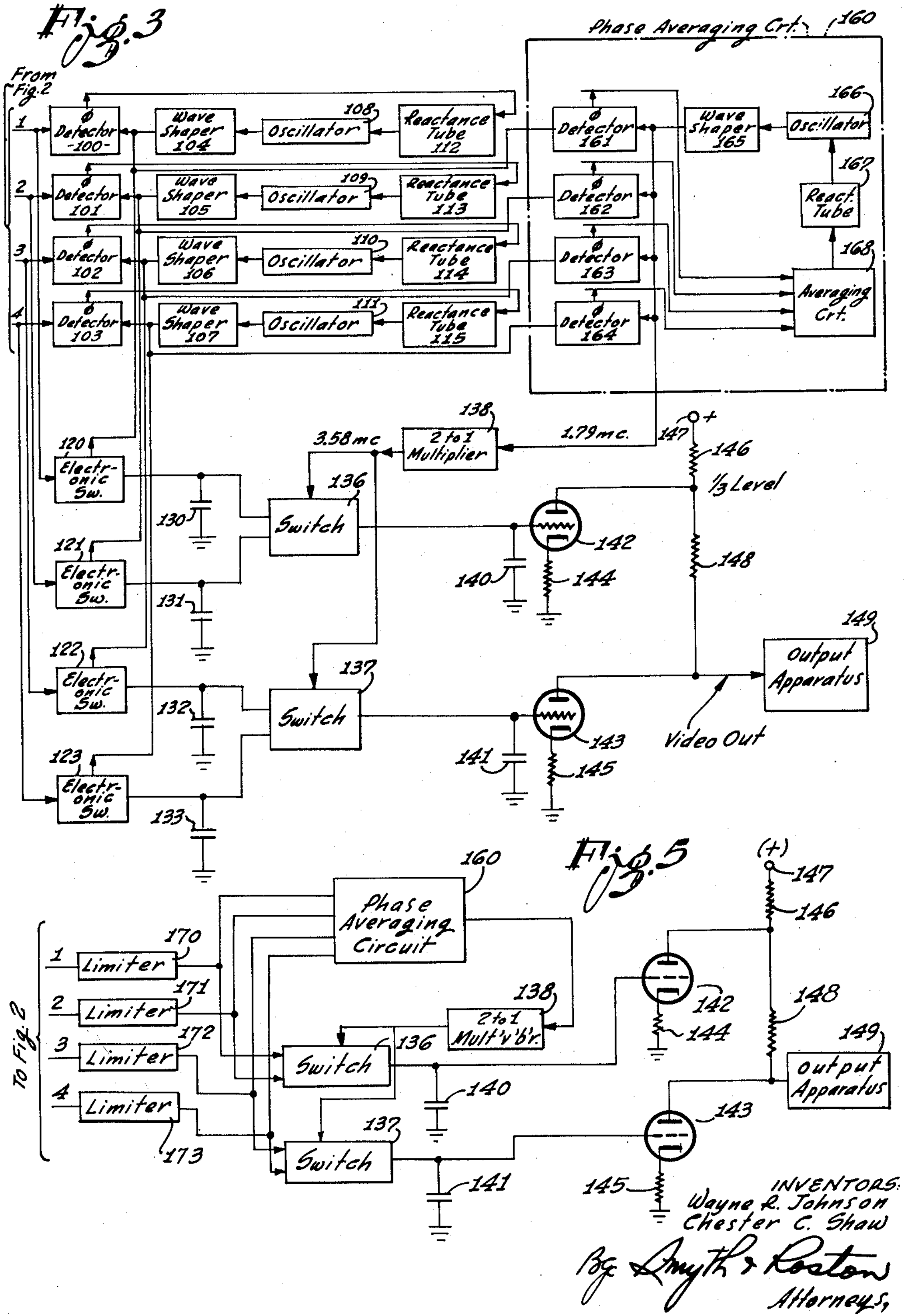
FIGURE 3 is a functional representation of the rest of the reproducing apparatus utilized in the recording and reproducing system of this invention.
FIGURE 5 is a functional arrangement of a portion of another embodiment of the reproducing apparatus utilized in the recording and reproducing system of this invention.

FIGURES 2 and 3 illustrate the reproducing apparatus of the recording and reproducing system of this invention. As shown in FIGURE 2, the magnetic tape 50 is moved at substantially constant speed adjacent four playback or pick-up transducer heads 62 through 65. The heads 62 through 65 which are positioned respectively adjacent the four tracks on the tape 50 may be of conventional form to translate the magnetic variations on the tape into electrical waves. The reproduced signals from the heads 62 through 65 are coupled respectively to four preamplifiers 70 through 73 and therefrom respectively to four equalizers 74 through 77.

The relative magnitudes of the components of the various frequencies in the band occupied by the signals are adjusted by the equalizers 74 through 77. Though, as recorded, each of the modulated signals has one of three magnitudes, these magnitudes vary over a number of samples at different rates. The variation of the modulation of the signals, therefore, varies at different frequencies and is accordingly amplified at different amounts during the recording and reproducing sequence. Actually, the higher frequencies are amplified by a greater amount than the lower frequencies. The equalizers 74 through 77 compensate for this unequal amplification.

In conventional television transmission, the blanking and synchronizing pulses are interspersed with the picture frequency signals at the end of each horizontal scanning line or every 63.5 microseconds. The blanking period of each horizontal line is approximately 14 percent of the period or approximately 9 microseconds. The equalizers 74 through 77 are essentially integrating arrangements and means are provided for returning the voltage level of the signals to a predetermined level at the beginning of each horizontal line during the blanking interval. Effectively, the clamping circuits 78 through 81, which are individually associated with the equalizers 74 through 77, establish periodically a zero axis for the signals from the equalizers 74 through 77. The clamping circuits 78 through 81 are operated in synchronism by a generator 85 which has a repetition rate of 15,750 cycles per second, which is the horizontal line frequency. The clamping circuits 78 through 81 are conventional but are coupled respectively by low pass filters 84 through 87 to the output of the equalizers 74 through 77. The low pass filters 84 through 87 insure that the clamping circuits 78 through 81 do not operate due to positive or negative peaks of noise which occur at random due to irregularities on the tape or thermal noise developed in the apparatus. During the horizontal blanking interval, therefore, the four channels are normalized and, thereafter, a series of sampling pulses at a frequency of 1.79 (½×3.58) megacycles are provided through each channel with each pulse having one of three different amplitudes in accordance with the coding provided by the recording apparatus.

The signals in the four different channels are provided respectively to three-level trigger arrangements 88 through 91. The arrangements 88 through 91 are each Schmidt type trigger arrangements which provide for three exact output potentials responsive to the three input potentials which may not be exact. In other words, for a potential within a predetermined range, the trigger arrangements 88 through 91 provide for one output; within a second range, provide for a second output; and within a third range, provide for a third output. As illustrated by the functionally detailed arrangement shown for the trigger arrangement 88, each of the arrangements 88 through 91 may include three trigger circuits 92, 93 and 94 which operate respectively for signals in three different ranges. The trigger circuit 92, for example, is operated for positive potentials over a predetermined magnitude, and the trigger circuit 94 may operate for negative potentials over a predetermined magnitude, while the trigger circuit 93 operates for intermediate values. The trigger circuits 92 through 94 are coupled respectively to a ground resistor 95 and to a lockout circuit 96 which insures that only one of the three circuits 92 to 94 can operate at any time. The output potential of each of the trigger arrangements 88 through 91 responsive to a reproduced sampling pulse is, therefore, at one of three exact potentials. The particular details shown in the arrangement 88 are merely illustrative as any type of three-level arrangement operating in this manner may be utilized.

The trigger arrangements 88 through 91 are coupled respectively to four electronic switches 120 through 123 (FIGURE 3) which may be similar to the electronic switch 11 described above. As is hereinafter described, the switches 120 through 123 function to sample the trivalued signals from the arrangements 81 through 91. The trigger circuits 88 through 91 are also coupled individually to four phase detectors 100 through 103 which are part of circuitry controlling the operation of the switches 120 to 123. The four phase detectors may be conventional and provide for an error signal which varies both in polarity and magnitude in accordance with the difference in phase of two signals introduced thereto.

Each of the phase detectors 100 through 103 is part of a feedback loop including respectively the oscillators 108 through 111 which develops a reference phase signal. The oscillators 108 through 111 are variable frequency oscillators, and the frequency of each is determined respectively by the reactance tubes 112 through 115 respectively coupled thereto. The nominal frequencies of the oscillators 108 through 111 may be ½ times 3.58 megacycles or 1.79 megacycles which is the repetition rate of the signals in each of the four channels. The oscillators 108 through 111 introduce the reference signals respectively to wave shapers 104 through 107. The shaped waves are thereupon introduced to the phase detectors 100 through 103 for comparison with the phase of the trivalued reproduced sampling signals. The error voltages from the phase detectors 100 through 103 are introduced respectively to the reactance tubes 112 through 115 which adjust the frequency of the oscillators 108 through 111. The oscillators 108 through 111 are accordingly locked in step with the signals in their respective channels. The signals in the four channels may be somewhat out-of-phase with each other because of flutter or skew of the tape 50 so that the oscillators 108 through 111 are not operated in synchronism with each other.

The pulses from the wave shapers 104 through 107, which are included respectively in the feedback loops, are introduced to a phase averaging circuit 160. The circuit 160 provides output pulses at the same nominal frequency as the pulses from each of the four wave shapers 104 through 107 but at a phase which is the average of the phase of the pulses from the four wave shapers 104 through 107. In the circuit 160, the pulses from the four wave shapers 104 through 107 are introduced respectively to four phase detectors 161 through 164. The phase detectors 161 through 164 may be similar to the phase detectors 100 through 103 described above. A phase reference signal is supplied to each of the phase detectors 160 through 164 from a variable frequency oscillator 166. The oscillator 166 couples the reference signals through a wave shaper 165 to all four phase detectors 161 through 164. The error signals from the four phase detectors 161 through 164 are provided to an averaging circuit 168 which provides an output control signal that is the average of the four signals introduced thereto. The averaging circuit 168 controls the impedance of a reactance tube 167 which adjusts the frequency of the oscillator 166. The pulses from the wave shaper 165, therefore, have a phase which is the average of the phases of the signals from the four wave shapers 104 through 107.

The average phase signals from the wave shaper 165, at a repetition rate of 1.78 megacycles, are introduced to a binary multiplier 138 which doubles the repetition rate of the pulses. The pulses at a repetition rate of 3.58 megacycles are provided to two electronic switches 136 and 137 which are similar to the switches 42 and 43 described above. The input to the switches 136 and 137 is supplied from four buffer capacitors 130 through 133 which are coupled respectively to the outputs of the four electronic switches 120 through 123 briefly mentioned above. As described above, the three-level reproduced signals from the trigger arrangements 88 through 91 are provided respectively to the four electronic switches 120 through 123 as well as to the four phase detectors 100 through 103.

The electronic switches 120 through 123 are operated respectively by the four wave shapers 104 through 107 in the feedback loops including the detectors 100 through 103. The electronic switches 120 through 123 do not operate, therefore, in exact synchronism but operate out-of-phase with each other under control of the pulses from the wave shapers 104 through 107. In the presence of flutter or skew, for example, the electronic switches 120 through 123 would not be operated in exact synchronism. The electronic switches 120 through 123 function to effectively sample the three level signals and charge the associated buffer capacitors 130 through 133 in accordance therewith. The two capacitors 130 and 131 are coupled to the switch 136 and the two capacitors 132 and 133 are coupled to the switch 137. In one operating condition of the switch 136, the potential across the capacitor 130 is sampled and in its other condition, the potential across the capacitor 131 is sampled. Similarly, for one condition of the switch 137, the potential across the capacitor 132 is sampled and for its other condition, the potential across the capacitor 133 is sampled.

The two switches 136 and 137 are operated in synchronism by the pulse from the pulse multiplier 138. The conditions of the switches 136 and 137 at any time is such as to sample the pair of buffer capacitors which are receiving the signals from the three level trigger arrangements 88 through 91. As described above, pairs of trigger arrangements 88—90 and 89—91 are operated alternately so that two of the capacitors 130 through 133 are receiving signals at any one time. The switches 136 and 137 are synchronized in accordance therewith and couple the sampling signal to two capacitors 140 and 141 at the input of two amplifier tubes 142 and 143, respectively. The signals from the switches 136 and 137 have been adjusted in accordance with any phase displacement between the signals on the four tracks. The phase adjustment is accomplished utilizing the phase averaging circuit 160 which, as described above, synchronously operates the switches 136 and 137 in accordance with the average phase of the four signals in the four channels.

The switches 136 and 137 are operated each 0.28 megacycle by the 3.58 megacycle pulses from the multiplier 138. Though the signals through each of the four channels and at the capacitors 130 through 133 vary at a rate of 1.79 megacycles, the pairs of channels are out of step so that the composite signals in the four channels vary at the 3.58 rate. The signals at the capacitors 130 and 132 are out of step with the signals at the capacitors 131 and 133 because of the effect of the switches 42 and 43 in the recording end of the system.

The signals from the switches 136 and 137 are provided, as described above, to the tubes 142 and 143. Each of the tubes 142 and 143 is a triode having its cathode coupled to ground by a conventional cathode resistor 144 and 145 respectively. The control grids are shunted to ground respectively by the capacitors 140 and 141 and the anodes are biased by a positive potential source 147 which is connected through a voltage divider arrangement including two resistors 146 and 148 to the two anodes. The junction of the resistors 146 and 148 is connected to the anode of the tube 142 and the resistor 148 is connected to the anode of the tube 143. The effect of a change of conductivity through the tube 142 has ⅓ of the effect of a change of conductivity of the tube 143 on the amplitude of the output signal provided from the anode of the tube 143 to an output apparatus 149. Due to the voltage divider arrangement including the resistors 146 through 148, only ⅓ of the magnitude of the potential at the junction of the resistors 146 through 148 appears at the output apparatus 149. The anode potential of each of the two vacuum tubes 142 and 143 may be at any one of three different exact levels in accordance with the tertiary coded information from the three-level trigger arrangements 88 through 91. Various combinations of the two three-level signals provide for the nine different possible amplitudes as described above and indicated on the coding table shown in FIGURE 4. The amplitude of the signals provided to the output apparatus 149 changes each 0.28 microsecond or at a frequency of 3.58 megacycles.

Because of the digital codings, any error in the amplitude of the output signals has a predetermined maximum value. The greater the number of digital steps that are utilized, the smaller the maximum possible error. For example, if 18 different possible magnitudes were utilized instead of nine, the possible error of any particular amplitude would be ½ the maximum possible error using nine steps. The signals to the output apparatus 149 have then a predetermined maximum error and are phase adjusted to compensate for flutter or skew or any misalignment between the transducer heads and the tape.

In FIGURE 3, the signals from the trigger arrangements 88 through 91 are provided respectively to detectors 100 through 103 which are locked in step therewith. The feedback loops utilized to synchronize the detectors 100 through 103, respectively, with the three level pulses control the electronic switches 120 through 123 and the phase averaging circuit 160. In the embodiment shown in FIGURE 5, the feedback loops and the switches 120 through 123 are not utilized. The functional arrangement depicted in FIGURE 5 may be substituted for the arrangement of FIGURE 3 with the leads designated 1 through 4 being coupled to the leads 1 through 4 at the right of FIGURE 2. The various components in FIGURE 5 which are identical with corresponding components in FIGURE 3, have been given the same reference designations.

The three level signals from the trigger circuit arrangements 88 through 91 are coupled respectively to four limiters 170 through 163 in FIGURE 5. The limiters 170 through 173 function to rectangularize or square the wave shape of the pulses from the trigger circuit arrangements 88 through 91. The limiters 170 through 173, which are not in step if there is any flutter or skew or any misalignment of the transducer heads, supply the square wave shaped pulses to the phase averaging circuit 160. The phase averaging circuit 160 is similar to the phase averaging circuit of FIGURE 3 and described above. The phase averaging circuit 160 controls the two switches 136 and 137 to sample the pulses from the limiters 170 through 173 in the manner described above in reference to FIGURE 3.

The switches 136 and 137 are operated at a repetition rate of 0.28 megacycle by the 3.58 megacycle pulses and the multiplier 138 which is driven by the circuit 160. The signals from the switches 136 and 137 are provided across capacitors 140 and 141 which are coupled to the control anodes of the triodes 142 and 143. The triodes 142 and 143 are part of a circuit arrangement for converting the pulses to analog representations.

Although this invention has been disclosed and illustrated with reference to particular applications, the principles involved are susceptible of numerous other applications which will be apparent to persons skilled in the art. For example, the frequency of the various oscillators may be different, illustratively one-half the above specified values, so that the tape 50 can be advanced at 60 inches per second instead of 120 for the 4 megacycle wide television band. The invention is, therefore, to be limited only as indicated by the scope of the appended claims.

What is claimed is:

1. In a recording and reproducing system for television signals, means for sampling the television signals to derive a step wave with each step having a magnitude and polarity related to the instantaneous magnitude and polarity of the television signals, a converter coupled to said sampling means for converting the step wave to pulse code modulated signals indicating the magnitude and polarity of the successive steps of the wave, a recording medium having a number of different recording tracks, and means coupled to said converter for combining the pulses of the pulse code modulated signals for each step of the step wave to derive a smaller number of pulses each having one of a number of different values, and means coupled to said combining means for recording pulses from the combining means on the different recording tracks of said recording medium.

2. In a system for recording wideband signals on a multitrack recording medium, a plurality of transducing heads positioned respectively adjacent the several tracks on the multitrack recording medium, switching means for successively sampling the wideband signals and for developing a step wave with the successive steps of the wave having magnitudes and polarities related to the instantaneous magnitudes and polarities of the wideband signals, an analog-to-digital converter coupled to said switching means for successively converting the successive steps of the step wave from said switching means to digital signals, a matrix circuit arrangement coupled to said converter for receiving the successive digital signals and for simultaneously providing a number of pulses representing each of the successive digital signals, differential amplifier means coupled to said matrix arrangement for combining the number of pulses representing each of the successive digital signals to derive a smaller number of pulses each having one of three values, and means coupled to said differential amplifier means for successively introducing the pulses therefrom to said transducing heads for recording on the several tracks of the recording medium.

3. In a multitrack recording and reproducing system for television signals which provides for a predetermined maximum distortion of the television signals, means for successively sampling the television signals, means coupled to said sampling means for converting the successive samplings to pulse code modulated signals, means coupled to said converting means for combining the pulses of the pulse code modulated signals for each sampling to derive a smaller number of pulses, means coupled to said combining means for recording the pulses from said combining means on several tracks of a multitrack recording medium, reproducing means coupled to the recording medium for recovering the recorded modulated signals, and demodulating means coupled to said reproducing means for converting the reproduced modulated signals to analog signals.

4. In a system for recording wideband signals on a multitrack recording medium, a plurality of transducing heads positioned respectively adjacent the several tracks on the multitrack recording medium, switching means for successively sampling the wideband signals and for developing a step wave with the successive steps of the wave having magnitudes and polarities related to the instantaneous magnitudes and polarities of the wideband signals, an analog-to-digital converter coupled to said switching means for successively converting the successive steps of the step wave from said switching means to digital signals, a matrix circuit arrangement coupled to said converter for receiving the successive digital signals and for simultaneously providing a number of pulses representing each of the successive digital signals, means coupled to said matrix circuit arrangement for combining the pulses therefrom to derive a smaller number of pulses for each of the successive digital signals, and switching means coupled to said combining means and synchronized with said first mentioned switching means for introducing the combined pulses to different ones of said transducing heads for the successive digital signals whereby the pulses representing successive samplings of the wideband signals are recorded on different tracks of the recording medium.

5. In a recording and reproducing system for providing transcriptions of television or like signals occupying a wide band of frequencies including components of higher frequency than the cutoff frequency of the reproducing equipment in the system, means for receiving the wide-band signals and for converting them to pulse code modulated signals representing successive instantaneous magnitudes and polarities of the wide-band signals, a recording medium having several recording tracks, a recording head coupled to each of the recording tracks on the recording medium, a plurality of switches coupled to said converting means for switching successive ones of the pulse code modulated signals to different ones of said recording heads for recording on the recording tracks on the recording medium, reproducing means coupled to the recording medium for recovering the recorded modulated signals from the several recording tracks whereby the signals are reproduced alternately from different ones of the several recording tracks, demodulating means for converting the reproduced signals back to analog form, means coupled to said reproducing means for determining the average phase of the signals reproduced from the several recording tracks on the recording means, and switching means coupled between said reproducing means and said demodulating means and operated by said average phase determining means to alternately couple reproduced signals from the different one of the several recording tracks to said demodulating means.

6. In a system for recording wideband signals on a multitrack recording medium, a plurality of transducing heads positioned respectively adjacent the several tracks on the multitrack recording medium, switching means for successively sampling the wideband signals and for developing a step wave with the successive steps of the wave having magnitudes and polarities related to the instantaneous magnitudes and polarities of the wideband signals, an analog-to-digital converter coupled to said switching means for successively converting the successive steps of the step wave from said switching means to digital signals, a matrix circuit arrangement coupled to said converter for receiving the successive digital signals and for simultaneously providing a number of pulses representing each of the successive digital signals, differential amplifier means coupled to said matrix arrangement for combining the number of pulses representing each of the successive digital signals to derive a smaller number of pulses each having one of three values, means coupled to said differential amplifier means for successively introducing the pulses therefrom to said transducing heads for recording on the several tracks of the recording medium, reproducing means coupled to the recording medium for recovering the recorded three-valued pulse from the several tracks on the recording medium whereby the three-valued pulses are reproduced alternately from different ones of the several recording tracks, and demodulating means coupled to said reproducing means for converting the reproduced three-valued pulses to analog form.

7. In a system for recording wideband signals on a multitrack recording medium, a plurality of transducing heads positioned respectively adjacent the several tracks on the multitrack recording medium, switching means for successively sampling the wideband signals and for developing a step wave with the successive steps of the wave having magnitudes and polarities related to the instantaneous magnitudes and polarities of the wideband signals, an analog-to-digital converter coupled to said switching means for successively converting the successive steps of the step wave from said switching means to digital signals, a matrix circuit arrangement coupled to said converter for receiving the successive digital signals and for simultaneously providing a number of pulses representing each of the successive digital signals, differential amplifier means coupled to said matrix arrangement for combining the number of pulses representing each of the successive digital signals to derive a smaller number of pulses each having one of three values, means coupled to said differential amplifier means for successively introducing the pulses threfrom to said transducing heads for recording on the several tracks of the recording medium, reproducing means coupled to the recording medium for recovering the recorded three-valued pulse from the several tracks on the recording medium whereby the three-valued pulses are reproduced alternately from different ones of the several recording tracks, demodulating means for converting samples of the three-valued pulses to analog form, means coupled to said reproducing means for determining the average phase of the three-valued pulses reproduced from the several recording tracks on the recording means, and switching means coupled between said reproducing means and said demodulating means and operated by said average phase determining means to alternately couple reproduced three-valued pulses.

8. In a multitrack recording and reproducing system in which wideband signals have been recorded in the form of successive pulses in several tracks of a recording medium, reproducing means coupled to the recording medium for recovering the pulses recorded in the several tracks, demodulating means for converting the reproduced signals to analog form, means coupled to said reproducing means for determining the average phase of the pulses reproduced from the several recording tracks on the recording means, and switching means coupled between said reproducing means and said demodulating means and operated by said average phase determining means to alternately couple reproduced pulses from a different one of the several recording tracks to said demodulating means.

9. In a recording and reproducing system for television signals on a recording medium having a number of recording tracks, means responsive to the television signals for sampling the television signals to derive a signal displaced in a particular direction through a plurality of steps related to the instantaneous magnitude and polarity of the television signals, means coupled to said sampling means for converting the displaced signal to a plurality of pulse code modulated signals where the pulse code modulated signals represent values of different weighted significance to provide an indication by all of such modulated signals as to the displacement of the displaced signals, means including a plurality of recording heads disposed relative to the recording tracks on the recording medium for recording the coded signals on the tracks, means including a plurality of switches synchronized with said sampling means for switching successive ones of the pulse code modulated signals in a particular sequence to different ones of said recording heads for recording on the recording tracks; means coupled to said plurality of switches for synchronizing said plurality of switches with said coupling means, means responsive to the signals recorded by the different recording heads on the tracks in the plurality for obtaining a reproduction of such signals from the tracks, storage means responsive to the signals reproduced in the particular sequence from the tracks for storing such signals, combining means responsive to the stored signals for combining such signals in a particular weighted significance corresponding to the weighted significance of the pulse code modulated signals to obtain a reproduction of the television signals, and switching means operatively coupled to the combining means and the storage means for obtaining a passage of the signals from the storage means to the combining means in a particular sequence related to the sequence of recording the pulse code modulated signals on the different tracks in the plurality.

10. In a system for recording wideband signals on a multitrack recording medium where the medium is movable in a first direction and where the tracks are displaced from one another in a second direction transverse to the first direction, means including a plurality of transducing heads positioned respectively adjacent the several tracks on the multitrack recording medium to record signals in the different tracks, switching means responsive to the wideband signals and including a converter for successively sampling the wideband signals and for developing a control signal having a step wave related to the instantaneous magnitudes and polarities of the wideband signals, means including a matrix circuit arrangement coupled to said switching means for successively converting the control signal to a plurality of pulses digitally representing the step wave of the control signal where the number of pulses in the plurality is less than the number of steps in the control signal and where the pulses in the plurality have a particular weighted relationship to one another, means coupled to said matrix circuit arrangement and including a plurality of transducing heads for sequentially introducing the pulses in the plurality to said plurality of transducing heads for recording on the several tracks of the recording medium, reproducing means including the plurality of transducing heads for obtaining the production of voltages having characteristics corresponding to the pulses recorded on the tracks by the heads, combining means operatively coupled to the reproducing means for combining the voltages from the combining means in the particular weighted relationship to obtain the reproduction of the wideband signals, and means operatively coupled to the combining means and the reproducing means for obtaining an introduction of the different voltages to the combining means from the reproducing means in a sequence related to the recording of the pulses in the different tracks on the medium.

11. In a recording and reproducing system for providing transcriptions of television or like signals occupying a wide band of frequencies including components of higher frequency than the cutoff frequency of the reproducing equipment in the system and for providing the transcription on a recording medium having a plurality of tracks, means responsive to the television signals for sampling the television signals to derive a signal having a step wave with each step having a magnitude and polarity related to the instantaneous magnitude and polarity of the television signals, means including a converter coupled to said sampling means for converting the step wave signal to pulse code modulated signals having a particular weighted relationship to indicate the magnitude and polarity of the successive steps of the wave where the the number of pulse code modulated signals is less than the number of steps in the step wave signals, a plurality of recording heads disposed relative to the recording tracks on the recording medium to record signals in the tracks, means including a plurality of switches synchronized with said sampling means for sequentially switching different ones of the pulse code modulated signals to different ones of said recording heads for recording on the recording tracks, reproducing means disposed relative to the recording medium for recovering the recorded modulated signals from the several recording tracks in a sequence related to the sequence of recording the signals in the different tracks, demodulating means responsive to the reproduced signals for combining the reproduced signals in a particular weighted relationship corresponding to the weighted relationship of the recorded pulse code modulated signals to convert the reproduced signals back to analog form, switching means coupled to said reproducing means and said demodulating means and synchronized with the operation of said plurality of switches for coupling the reproduced signals to said demodulating means, and means coupled to said switching means for synchronizing the operation of said switching means with the switching operation of said plurality of switches.

12. In a recording and reproducing system for providing transcriptions of television or like signals occupying a wide band of frequencies including components of higher frequency than the cutoff frequency of the reproducing equipment in the system and for providing the transcriptions on a recording medium having a plurality of recording tracks, means responsive to the wide-band signals for converting these signals to pulse code modulated signals having a particular weighted significance to represent successive instantaneous magnitudes and polarities of the wide-band signals, means including a plurality of recording heads disposed relative to the recording tracks on the recording medium to record signals in the tracks, means including a plurality of switches coupled to said converting means for sequentially switching different ones of the pulse code modulated signals to different ones of said recording heads for recording such signals in sequence on the recording tracks on the recording medium, reproducing means responsive to the signals recorded in the different tracks on the recording medium for obtaining a production of voltages having amplitude characteristics corresponding to the characteristics of the signals recorded in the different tracks, means responsive to the voltages produced by the reproducing means for combining such voltages in the particular weighted relationship to obtain a reproduction of the wide band signals, and means operatively coupled to the last mentioned means and to the reproducing means for obtaining a passage of the voltages from the reproducing means to the last mentioned means in a particular sequence related to the sequence of recording the signals in the different tracks on the medium.

13. The recording and reproducing system set forth in claim 12, wherein means are responsive to the television signals to convert the television signals to a control signal having a plurality of steps representing the television signals and wherein the converting means are responsive to the control signals to produce the pulse code modulated signals and wherein the number of the pulse code modulated signals is less than the number of steps in the control signal.

14. In a multitrack recording and reproducing system in which wideband signals have been recorded in a medium movable in a first direction as pulses in a plurality of tracks disposed relative to each other in a second direction transverse to the first direction where the different pulses sensed in the tracks in the plurality at each instant are provided with particular weighted significance to represent the characteristics of the wideband signals, reproducing means disposed relative to the recording medium for recovering the pulses recorded in the several tracks, demodulating means operatively coupled to the reproducing means for converting the reproduced pulses to a composite signal having an amplitude representing the characteristics of the wideband signals, means coupled to said reproducing means for determining the average phase of the pulses reproduced from the several recording tracks on the recording means, and means coupled to said reproducing means and to said demodulating means and operated by said average phase determining means for coupling the pulses reproduced from said tracks to said demodulating means in a particular timed relationship to obtain the production of the composite signal by the demodulating means.

15. In a reproducing system wherein a signal having analogue characteristics is converted to a plurality of pulse code modulated signals having different weighted characteristics and wherein the pulse code modulated signals are recorded in different tracks on a recording medium movable in a first direction and wherein the pulse code modulated signals representing the analogue signals are recorded in a particular sequence in the different tracks and wherein the recording tracks are displaced in a second direction transverse to the first direction, reproducing means responsive to the pulse code modulated signals recorded in the different tracks for reproducing such signals, energy storage means responsive to the pulse code modulated signals reproduced from the different tracks for storing energy representing such signals, switching means operatively coupled to the energy storing means for providing for the passage of energy from the energy storage means in a sequence related to the sequence of the recording of the pulse code modulated signals and in accordance with the characteristics of the signals reproduced from the different tracks, and combining means operatively coupled to the energy storage means for combining the signals passing from the energy storage means in a particular weighted relationship corresponding to the weighted characteristics of the pulses recorded in the different tracks to reproduce the analogue signal.

16. The reproducing system set forth in claim 15 in which means are operatively coupled to the energy storage means and to the switching means for obtaining the passage of energy from the energy storage means to the combining means in a particular timed relationship corresponding to the times for the recording of the pulse code modulated signals in the different tracks in the plurality.

17. In a reproducing system wherein a signal having analogue characteristics is converted to a plurality of pulse code modulated signals having different weighted characteristics and wherein the pulse code modulated signals are recorded in different tracks on a recording medium movable in a first direction and wherein the pulse code modulated signals representing the analogue signal are recorded in a particular sequence in the different tracks, reproducing means disposed relative to the medium for reproducing the pulse code modulated signals in the different tracks, switching means responsive to the pulse code modulated signals reproduced from the different tracks for passing such signals in a sequence related to the sequences for the recording of the signals in the different tracks, and means including a matrix arrangement responsive to the sequence of pulse code modulated signals passing through the switching means for providing such signals with weighted characteristics related to the weighted characteristics of the pulse code modulated signals and for combining the signals with weighted characteristics in a particular relationship to obtain a reproduction of the analogue signal.

18. The reproducing system set forth in claim 17 in which means responsive to the pulse code modulated signals are operatively coupled to the switching means to obtain a passage of the pulse code modulated signals through the switching means in a timed relationship corresponding to the times for the recording of the pulse code modulated signals in the different tracks in the plurality.

References Cited in the file of this patent

UNITED STATES PATENTS

| | | |
|---|---|---|
| 2,552,619 | Carbrey | May 15, 1951 |
| 2,628,346 | Burkhart | Feb. 10, 1953 |
| 2,651,716 | Feissel | Sept. 8, 1953 |
| 2,881,255 | Hall | Apr. 7, 1959 |
| 2,958,735 | Maier et al. | Nov. 1, 1960 |

FOREIGN PATENTS

| | | |
|---|---|---|
| 1,176,333 | France | Nov. 24, 1958 |